United States Patent
Breen

[11] Patent Number: 5,102,202
[45] Date of Patent: Apr. 7, 1992

[54] METHOD FOR CALCULATING A VALUE INDICATIVE OF DYNAMIC TURNING RADIUS OF CURVATURE

[75] Inventor: Michael T. Breen, Garden City, Mich.

[73] Assignee: Eaton Corporation, Cleveland, Ohio

[21] Appl. No.: 640,784

[22] Filed: Jan. 14, 1991

[51] Int. Cl.⁵ .............................................. B60T 13/00
[52] U.S. Cl. ........................................ 303/7; 303/100; 280/432
[58] Field of Search ........................... 303/7, 100, 110; 280/432; 188/3 R, 112 A

[56] References Cited

U.S. PATENT DOCUMENTS

| | | | |
|---|---|---|---|
| 3,618,983 | 10/1971 | Forse | 280/432 |
| 3,810,521 | 5/1974 | Sparr | 180/103 |
| 3,840,276 | 10/1974 | Jubenville | 303/7 X |
| 3,894,773 | 7/1975 | Cleveland et al. | 303/21 |
| 3,993,362 | 11/1976 | Kamis et al. | 303/7 X |
| 4,023,863 | 5/1977 | Sisson et al. | 303/7 |
| 4,023,864 | 5/1977 | Lang et al. | 303/20 |
| 4,040,507 | 11/1975 | Reise | 188/112 |
| 4,196,936 | 2/1978 | Snyder | 303/20 |
| 4,232,910 | 11/1980 | Snyder et al. | 303/7 X |
| 4,254,998 | 10/1978 | Marshall et al. | 303/20 |
| 4,405,145 | 9/1983 | Bergman et al. | 280/432 |
| 4,620,717 | 10/1986 | Ivony et al. | 280/432 |
| 4,763,916 | 8/1988 | Ratskó et al. | 280/432 |
| 4,768,810 | 9/1988 | Sullivan et al. | 303/100 X |
| 4,902,076 | 2/1990 | Ushijima et al. | 303/100 |
| 4,919,494 | 4/1990 | Higashimata et al. | 303/100 |
| 5,005,130 | 4/1991 | Breen et al. | 303/47 |
| 5,029,948 | 6/1991 | Breen et al. | 303/7 |
| 5,032,821 | 7/1991 | Domanico et al. | 280/432 X |

Primary Examiner—Robert J. Oberleitner
Assistant Examiner—Lee W. Young
Attorney, Agent, or Firm—H. D. Gordon

[57] ABSTRACT

A method for calculating a value indicative of tractor dynamic turning radius of curvature (DTRC), and of the level of confidence in the determined value, is provided. Wheel speeds from a front-steer axle (40) and a rear axle (36, 38) are sensed to determine the value indicative of DTRC and the speed variance between the wheels on each side of the vehicle (VAR-L, VAR-R). The speed variance values are used to calculate a filtered value of DTRC (FDTRC) and to determine a level of confidence in the DTRC and/or FDTRC values.

11 Claims, 9 Drawing Sheets

METHOD FOR CALCULATING A VALUE INDICATIVE OF DYNAMIC TURNING RADIUS OF CURVATURE

BACKGROUND OF THE INVENTION

1. Related Applications

This application is related to U.S. Ser. No. 454,110 (now U.S. Pat. No. 5,029,948) titled Trailer Anti-Swing System and Method; U.S. Ser. No. 454,109 (now U.S. Pat. No. 5,033,798) titled Trailer Brake Anti-Swing System and Method, U.S. Ser. No. 454,096 titled Articulation Angle Sensor, U.S. Ser. No. 454,602 (now U.S. Pat. No. 5,022,714) titled Tractor Trailer Anti-Trailer Swing System and Method, U.S. Ser. No. 454,095 (now U.S. Pat. No. 5,005,130) titled Anti-Trailer Swing Control, and U.S. Ser. No. 454,574 (now U.S. Pat. No. 5,001,639) titled Tractor Trailer Articulation Control System and Method, all assigned to the assignee of this application and filed Dec. 20, 1989.

This application is also related to U.S. Ser. No. 640,788 titled TRAILER BRAKE CONTROL which is assigned to the same assignee and filed the same day, Jan. 14, 1991, as this application.

2. Field of the Invention

The present invention relates to a control system/method for controlling the braking force applied to the brakes of a towed subvehicle in an articulated vehicle system, such as the semitrailer subvehicle in a tractor-semitrailer system, to prevent, arrest, minimize and/or quickly recover from, the condition known as trailer brake induced trailer swing.

In particular, the present invention relates to a control method/system for calculating a value indicative of vehicular dynamic turning radius of curvature, and of the confidence level in the accuracy of such value, which are used to sense a trailer swing event and/or to initiate corrective action in response thereto.

3. Description of the Prior Art

Brake control systems for all types of vehicles, including heavy duty tractor-semitrailer trucks, to improve the stopping and vehicle stability thereof are, of course, well known in the prior art.

Brake systems of the anti-lock type, for all types of vehicles, are well known in the prior art. Briefly, these systems operate to maintain vehicle stability (i.e. acceptable transverse coefficient of friction of braked wheels) by maintaining the longitudinal slip of the braked wheels within predetermined limits. This usually requires modulating the braking forces on an individual wheel and/or individual axle basis to maintain at least some wheel rotation. Examples of prior art anti-lock brake systems ("ABSs") may be seen by reference to U.S. Pat. Nos. 3,767,270; 3,768,872; 3,854,556; 3,893,696; 3,929,383; 3,929,382; 3,966,267; 4,392,202 and 4,591,213, the disclosures of all of which are hereby incorporated by reference.

Brakes systems which control braking to achieve a driver demand, sense driver demand in a "brake-by-wire" manner, sense coefficient of friction and modify brake forces accordingly, sense load on a wheel and modify braking effort accordingly, sense wheel slip and/or use electronic signals to achieve trailer brake response are also disclosed in the prior art as may be seen by reference to U.S. Pat. Nos. 4,140,352; 4,327,414; 4,494,199; 4,512,615; 4,545,240; 4,591,213; 4,606,586; 4,616,881; 4,648,663 and 4,768,840, the disclosures of which are hereby incorporated by reference.

Brake systems for heavy duty articulated vehicles such as tractor-semitrailer trucks are difficult to design as the loading and maintenance will vary in a truck, such as the loading on the tractor of a tractor-trailer which may comprise a tractor only, a tractor with an empty or lightly loaded trailer or a tractor with a heavily loaded trailer.

Further, tractor-semitrailers are, by their nature, capable of exhibiting certain unstable dynamic behaviors known as jackknife and trailer swing, each of which has its own characteristic cause, effect and appropriate sequence of corrective action. Jackknife is sometimes called "tractor brake caused jackknife" while trailer swing is sometimes called "trailer brake caused jackknife".

The dynamics of undesirable trailer articulation events, such as a jackknife event, are discussed in SAE Paper No. 710045, the disclosure of which is hereby incorporated by reference.

Various systems to prevent or minimize undesirable trailer articulation have been proposed. These include mechanical devices such as chains or variable pivot resistance devices and also wheel speed sensors and anti-lock controls on the trailer per se. Examples of these prior art devices may be seen by reference to U.S. Pat. Nos. 3,618,983; 3,810,521; 3,894,773; 4,023,864, 4,254,998, 4,040,507, 4,196,936, 4,405,145 and 4,620,717 the disclosures of which are hereby incorporated by reference.

The prior art mechanical type devices were not satisfactory as the mechanical devices were somewhat slow to react, hindered required articulation during normal operation, required specially equipped/configured trailers and/or did not allow for a recovery from the locked-in condition. The anti-lock (ABS) type systems were not totally satisfactory as most existing trailers do not have ABS equipment, tractors are often driven with a variety of trailers and thus even if a trailer is provided with ABS equipment, it may not be compatible with the tractor ABS, providing all existing and future trailers with ABS equipment is prohibitively expensive and, under certain conditions, undesirable trailer articulation may occur in the absence of the wheel lock conditions sensed and reacted to by existing ABSs.

The prior art controls were not satisfactory as a system/method to detect unacceptable trailer articulation during a vehicle maneuver (such as changing lanes in a curve) was not provided.

The above-mentioned copending application, U.S. Ser. No. 640,788 filed the same day, Jan. 14, 1991, as this application and titled TRAILER BRAKE CONTROL discloses a trailer brake control system/method wherein a value approximating the tractor dynamic turning radius of curvature, or a time derivative thereof, is calculated and is used to determine if a trailer swing event is incipient and/or occuring during steady turning and/or vehicle maneuvering conditions.

SUMMARY OF THE INVENTION

In accordance with the present invention, a method/system for calculating a value indicative of the dynamic turning radius curvature (DTRC) of at least one tractor axle and for calculating the level of confidence in the accuracy of said value indicative of the tractor axle dynamic turning radius of curvature is provided. Further, the trailer brake control system is provided which, provided the confidence level in the value indicative of tractor axle dynamic turning radius of curvature is at least equal to a predetermined confidence level, will utilize the value indicative of dynamic turning radius of curvature to sense the onset of an unacceptable trailer articulation event during vehicle turning and maneuvering and will control the actuation pressure supplied to the trailer brake system to halt sensed trailer swing initiation and allow the trailer to safely recover therefrom. If the determined level of confidence in the value indicative of tractor axle dynamic turning radius curvature does not equal said predetermined confidence reference value, then the system will take no corrective action to prevent exacerbating the existing vehicle condition.

The above is accomplished by providing a control system/method wherein the dynamic turning radius of curvature is computed for at least one, preferably for each, axle of the tractor and the values of dynamic turning radius of curvature are then used as input to a second order low-pass adaptive filters, the gains of which are adjusted as a function of the sum of the left and right wheel speed variances. The filtered outputs (FDTRC) are then used to determine if a trailer brake induced trailer swing event is incipient or occurring. The degree of confidence is determined by subtracting the filter inputs (DTRC) from the filter outputs (FDTRC) and if the results are near zero, the confidence is said to be high while if the absolute value of the results are significantly greater than zero, then the confidence is said to be low. The trailer stability system is prevented from activation if the degree of confidence for at least one of the axles of the vehicle is not relatively high.

Accordingly, it is an object of the present invention to provide a method/system for calculating vehicle axle dynamic turning radius of curvature and the degree of confidence therein.

It is another object of the present invention to provide a method/system for determining the degree of confidence in a calculated value for a tractor axle dynamic turning radius of curvature.

The further object of the present invention is to provide an improved tractor brake control system/method for a tractor-semitrailer type vehicle wherein a calculated value indicative of tractor dynamic turning radius of curvature is utilized to detect the onset of a trailer swing condition and wherein the trailer stability system will be activated to prevent or to minimize or allow recovery from the trailer swing condition only if the degree of confidence in the calculated values indicative of tractor dynamic turning radius of curvature is relatively high.

This and other objects and advantages of the present invention will become apparent from a reading of the detailed disclosure of the preferred embodiments taken in connection with the drawings.

DESCRIPTION OF THE PREFERRED EMBODIMENT

Figure 1:
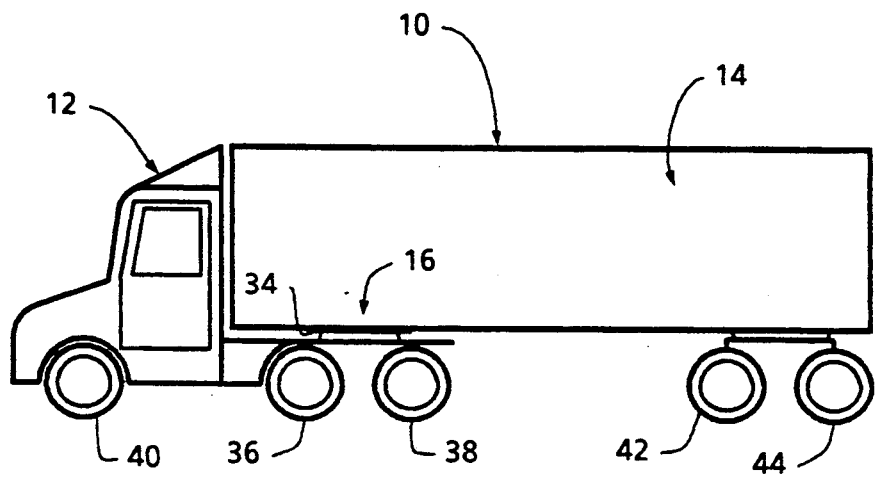
FIG. 1 is a schematic illustration of a conventional heavy duty tractor-semitrailer truck articulated vehicle.

The trailer anti-swing control system/method of the present invention is applicable to articulated multiple vehicle systems such as the tractor-semitrailer system 10 illustrated in FIG. 1. Briefly, as is well known to the prior art, the tractor-semitrailer system 10 comprises a tractor 12 and a semitrailer 14 attached thereto by a connecting means 16 which comprises the well known fifth wheel 34 fixed to the tractor for selective engagement with a king pin fixed to the trailer. The tractor typically comprises a pair or tandem set of rear drive axles 36 and 38 and a front steer axle 40. The trailer 14 typically comprises a tandem pair of non-steerable, non-driven trailer axles 42 and 44. Typically, but not necessarily, the front axle 40 will have non-driven steerable wheels. The tractor and/or the trailer may be equipped with single or three or more drive and/or trailer axles.

The term "trailer" as used herein is intended to apply to various trailed subvehicles including semitrailers.

The ability to utilize fifth wheel/king pin connections to relatively quickly and easily couple or connect standardly equipped tractors to standardly equipped semitrailers in an articulated or pivoted manner provides the well appreciated advantages of commercial and operational flexibility as well as increasing the maneuverability of the vehicles. However, under certain conditions, often associated with braking while negotiating a curve or a turn, one or both of the tractor-semitrailer subvehicles may lose transverse stability resulting in a condition of uncontrolled excessive articulation, i.e. jackknife or trailer swing. Tractor-semitrailer uncontrolled excessive articulation is generally considered to consist of two distinct types of events, namely "jackknife" and "trailer swing", both of which may lead to catastrophic results.

Jackknifing, which is considered to be the most severe and least correctable type of uncontrolled excessive trailer articulation event, usually results from the tractor subvehicle, usually the tractor subvehicle drivewheels, losing transverse stability, often while cornering, which lack of stability is quickly compounded by the often relatively many times greater inertia imposed by the trailer. The other type of uncontrolled excessive trailer articulation event, trailer swing, is generally the result of the trailer wheels, 42 and 44, losing transverse stability usually cornering, resulting in the trailer swinging radially outwardly relative to the center of the curve being negotiated which may result in the trailer swinging into adjacent traffic lanes with the obvious potential for catastrophic results therefrom.

Trailer swing events often occur less rapidly than jackknife events, and, upon sensing conditions indicative of the advent of a trailer swing condition, corrective action may be taken of the trailer brakes to minimize the extent of trailer swing and to cause the trailer to resume its tracking condition.

As is very well known, decreasing the slip of a tire will increase the transverse coefficient of friction thereof. Accordingly, trailer swing events induced by locked or almost locked trailer brakes, if sensed at the onset or initiation thereof, may be arrested or reduced by increasing the transverse stability of the trailer wheels by releasing the brakes thereof and allowing the wheels to roll up to or towards vehicle speed. The schematic illustration of an extreme trailer swing event may be seen by reference to FIG. 6 wherein the trailer at the right-hand portion of the illustrated curve has swung totally out of its lane. The purpose of the control system/method of the present invention is to prevent the occurrence of, or to minimize the extent of, trailer brake induced trailer swing events.

The trailer brake control system/method of the present invention is preferably utilized with a tractor 12 fully equipped with an ABS system and a trailer 14 equipped with a standard, i.e. non-ABS, brake system. However, the control of the present invention would also provide benefits if utilized with a vehicle having both tractor and trailer ABS as, under certain conditions, undesirable trailer articulation may occur even though the vehicle wheels have not locked up to the extent that is necessary to cause corrective action by currently existing ABS systems. Additionally, although not preferred, the trailer anti-swing control system/method of the present invention will provide a degree of improved vehicle stability when utilized on a tractor trailer system wherein neither the tractor nor the trailer was provided with an ABS logic control.

As stated above, the purpose of the present invention is to prevent or minimize trailer brake induced trailer swing events while the occurrence of jackknife events is minimized by the provision of the tractor ABS control logic and devices.

Figure 2:
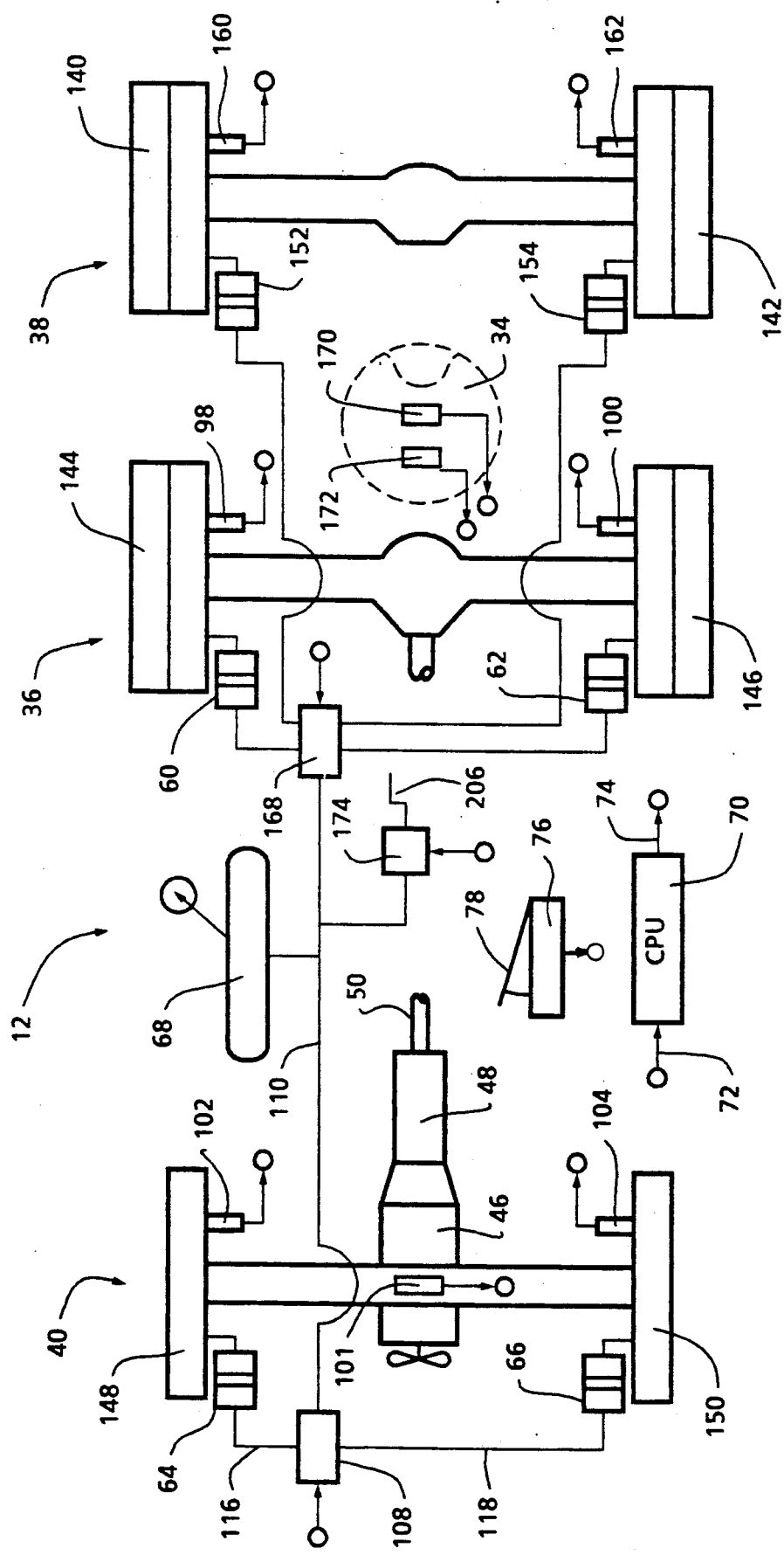
FIG. 2 is a schematic illustration of a tractor mounted brake control system including an anti-lock brake system, and also incorporating the trailer anti-swing control system of the present invention.

A braking system for the tractor 12 of an articulated tractor-semitrailer system 10 which utilizes the trailer brake control system/method of the present invention may be seen by reference to FIG. 2. It is noted that while the braking system for tractor 12 illustrated in FIG. 2 is of the "brake by wire" type, the present invention is equally applicable to other types of brake controls and ABS systems.

Briefly, as is well known in the prior art, tractor 12 includes a front steer axle 40, which is usually not driven, and a tandem pair of rear drive axles comprising front-rear drive axle 36 and rear-rear drive axle 38. Wheels 140 and 142 are associated with the rear-rear drive axle 38, wheels 144 and 146 are associated with the front-rear drive axle 36 and wheels 148 and 150 are associated with the front steer axle 40. The rear drive axles, 36 and 38, are driven by engine 46 through transmission 48 and driveline 50.

Air actuated brake chambers 60, 62, 152, and 154 are provided for retarding the rotation of wheels 144, 146, 140 and 142, respectively. The rear brakes 60, 62, 152 and 154 are, as is well known in the prior art, of the same size and type as likewise are the front brakes 64 and 66 which are provided for selectively braking the rotation of front steer drive axle wheels 148 and 150, respectively. In the system illustrated, the brakes are air actuated brakes of one of the well known types, such as the "S" cam actuated brake type or the air disc brake type, the details of which are well known in the prior art and may be seen in greater detail by reference to U.S. Pat. Nos. 4,476,968 and 4,457,407, the disclosures of both of which are hereby incorporated by reference. While all of the front brakes and all of the rear brakes should be of the same size and type, it is not necessary, and is not preferable, that the front and rear brakes be of the same size. Compressed air for actuating the brakes is supplied from a plurality of supply tanks 68, only one of which is shown, which supply tanks are provided with compressed air from the vehicle onboard compressor (not shown) or the like.

The braking system includes a control unit 70, which for purpose of flexibility and responsiveness is preferably an electronic microprocessor based control unit having means 72 for receiving a plurality of input signals, means for processing input signals in accordance with predetermined logic rules, and means 74 for issuing command output signals to various system operators. Control units of this type are well known in the prior art as may be seen by reference to U.S. Pat. No. 4,595,986, the disclosure of which is incorporated by reference.

A sensor 76 senses the operator's displacement of a brake pedal 78 to provide an input signal indicative of the driver's demand or vehicle stopping effort. Sensors of this type are known in the prior art and may be seen by reference to above-mentioned U.S. Pat. Nos. 4,140,352; 4,327,414 and 4,512,615. Typically, such transducers will sense the displacement of and/or force applied to the brake pedal 78 and will provide an output signal proportional thereto. As indicated above, the present invention is equally applicable to more conventional brake systems wherein the amount of braking effort is controlled by a well known treadle valve. To provide tractor ABS operation, wheel speed sensors 160, 162, 98, 100, 102, 104 are provided for providing input signals indicative of the rotational speed of wheels 140, 142, 144, 146, 148 and 150, respectively. A sensor 101 may be provided to providing input signals indicative of the steer angle of the front steer wheels 148 and 150. See U.S. Pat. Nos. 4,219,208, 4,728,923 and 4,800,976, the disclosures of which are incorporated herein by reference.

The central processing unit 70 will, as is well known in the ABS prior art, process the input signals in accordance with predetermined logic rules to generate command output signals to the front control valve 108 and the rear control valve 168. Briefly, control valve 108 is connected to the supply tank 68 through supply line 110, and, in accordance with the command output signals from CPU 70, independently pressurizes the conduits 116 and 118 leading to air brakes 64 and 66, respectively. Rear control valve 168 is also connected to supply tank 68 through supply line 110 and, in accordance with command output signals from CPU 70, individually provides pressurized fluid via branch conduits to the rear axle brakes 60, 62, 152 and 154. Accordingly, it may be seen that the braking efforts of each of the tractor wheels may be individually controlled for ABS purposes in a closed loop manner in response to command output signals generated by the CPU 70 in response to the input signals received and processed thereby, as is known ABS technology.

To provide the trailer brake anti-swing control system/method of the present invention, the tractor braking system is also provided with one or more sensors 170 and 172, preferably mounted on the tractor such as at the fifth wheel 34, for providing input signals to CPU 70 indicative of and/or allowing the calculation of the current articulation angle (AA), and of time derivatives thereof such as the rate of change of articulation angle (dAA/dt) and the rate of change of the rate of change of articulation angle ($d^2AA/dt^2$). Of course, sensors may be provided for directly sensing one or more of the time derivatives of articulation angle. In addition, a control valve 174, controlled by command outputs from CPU 70, will provide pilot controls to the standard trailer brake system control valves. Preferably, the control valve 174 is located on the tractor just upstream of one of the gladhand connectors 206. Valves 108, 168 and 174 may be replaced by a standard treadle valve having an output proportional to the displacement of brake pedal 78 and an ABS type valve connected in series downstream therefrom.

Applicant's convention for the measurement of articulation angle, and the first and second derivatives thereof with respect to time, and various sensing means for sensing same will be described in greater detail below.

Figure 3:
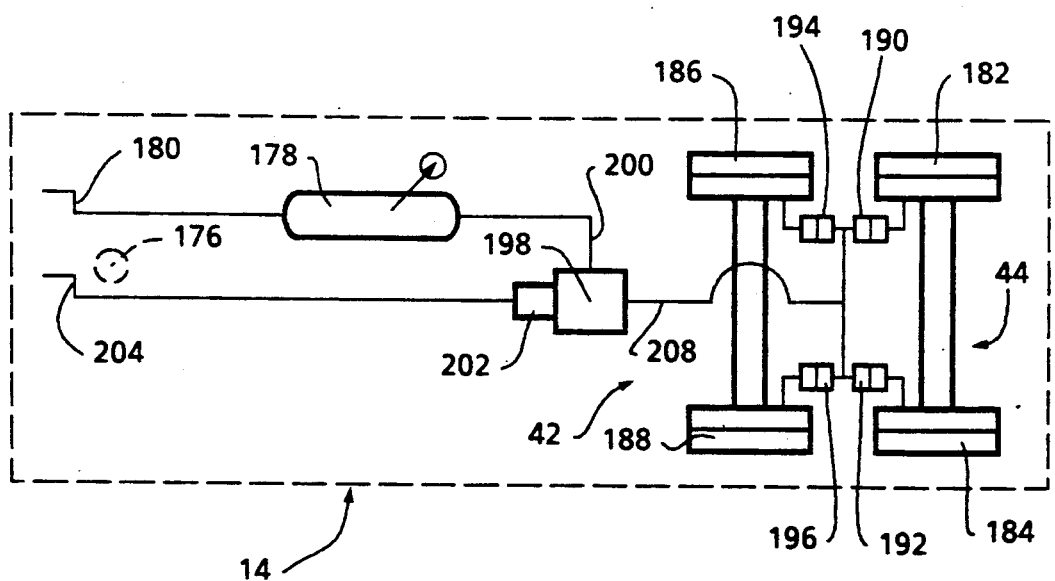
FIG. 3 is a schematic illustration of a standard trailer brake system which may be utilized with the trailer anti-swing brake control system of the present invention.

Referring now to FIG. 3, a prior art standard trailer brake system (i.e, non-ABS) is illustrated. Briefly, the trailer includes a king pin 176 for selective engagement and disengagement to the tractor fifth wheel 34 as is well known in the prior art. The trailer includes a supply tank 178 connected to the tractor air system by means of a fluid connection 180. Trailer axles 42 and 44 support trailer wheels 182, 184, 186 and 188, each of which is provided with an air brake actuators or chambers 190, 192, 194 and 196, respectively. Typically, all of the trailer brakes are controlled at the same pressure by means of a relay valve 198 which has an inlet 200 connected to the trailer supply tank 178 and a pilot valve portion 202 for receiving a pilot air signal from the tractor air system by means of connector 204. Each of the trailer brakes is actuated at approximately the same pressure from a single output 208 from a pilot controlled relay valve 198.

Connector 204 is designed for connection with connector 206 on the tractor. Briefly, the connectors 204 and 206 and likewise connector 180 and its associated connection with a vehicle air system (not shown) form the fluid connection commonly known as the "gladhand".

Figure 4:
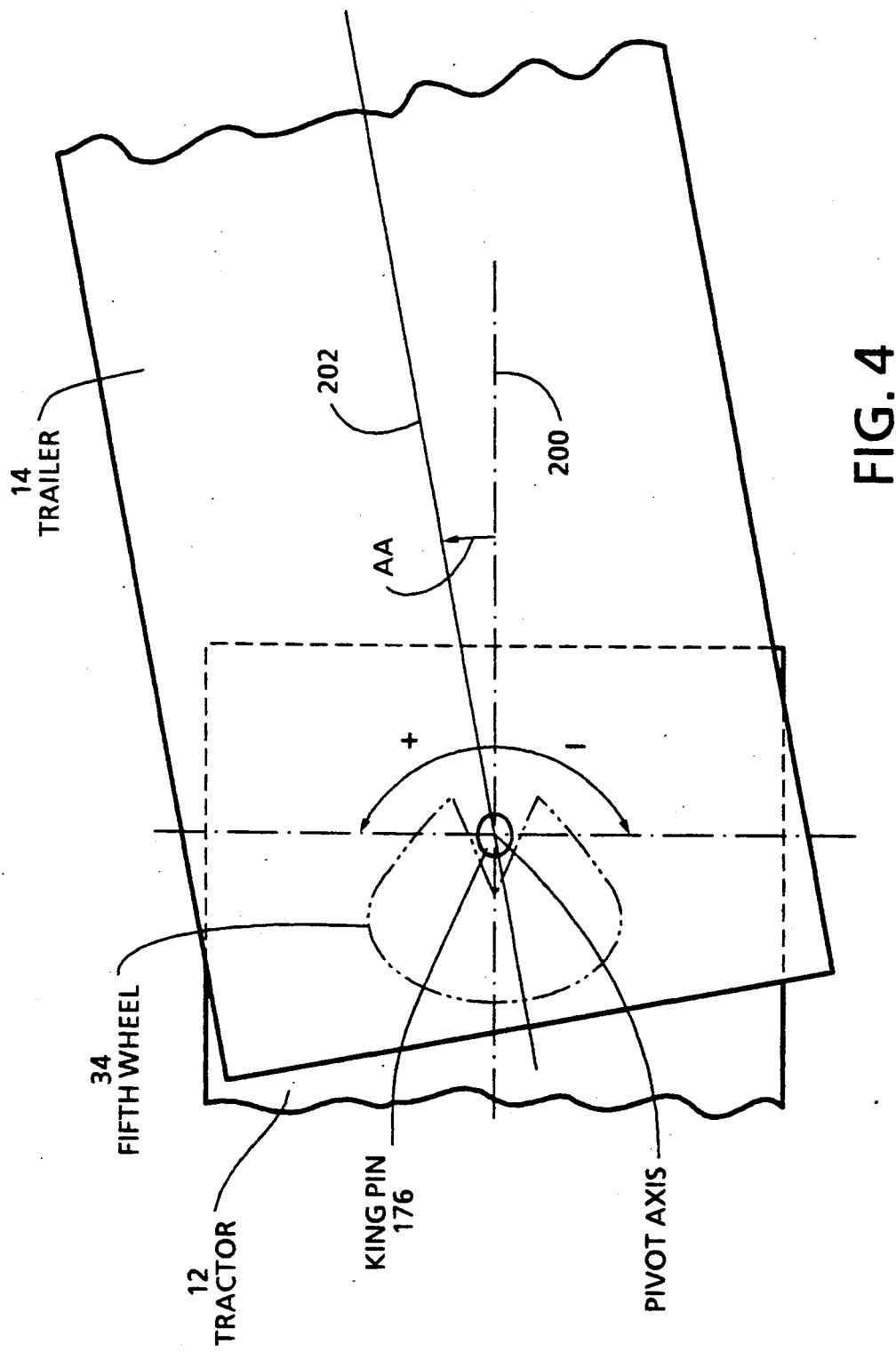
FIG. 4 is an enlarged, fragmentary, schematic illustration of the king pin/fifth wheel pivotal connection between a tractor and a semitrailer illustrating the angular relationship defined by the articulation angle.

Applicant's convention, which will be used throughout this application, for the measure of the articulation angle (AA) may be best understood by reference to FIG. 4 wherein the pivot axis between the tractor 12 and trailer 14 defined by the fifth wheel 34 and king pin 176 connection is viewed from the top of the vehicle, i.e. with the trailer extending rearwardly from left to right as shown in FIG. 4. The articulation angle between the tractor and trailer, AA, is defined as the included angle between the longitudinal axis 200 of the tractor 12 passing through the king pin/fifth wheel pivot axis and the longitudinal axis 202 of the trailer 14 passing through the fifth wheel/king pin pivot axis. The articulation angle AA is measured from the tractor longitudinal axis 200 to the trailer longitudinal axis 202 and is assigned a positive value in the counterclockwise direction and a negative value in the clockwise direction. In the example shown in FIG. 4, accordingly, the articulation angle AA would have a positive value under applicant's herein defined convention.

Figure 6:
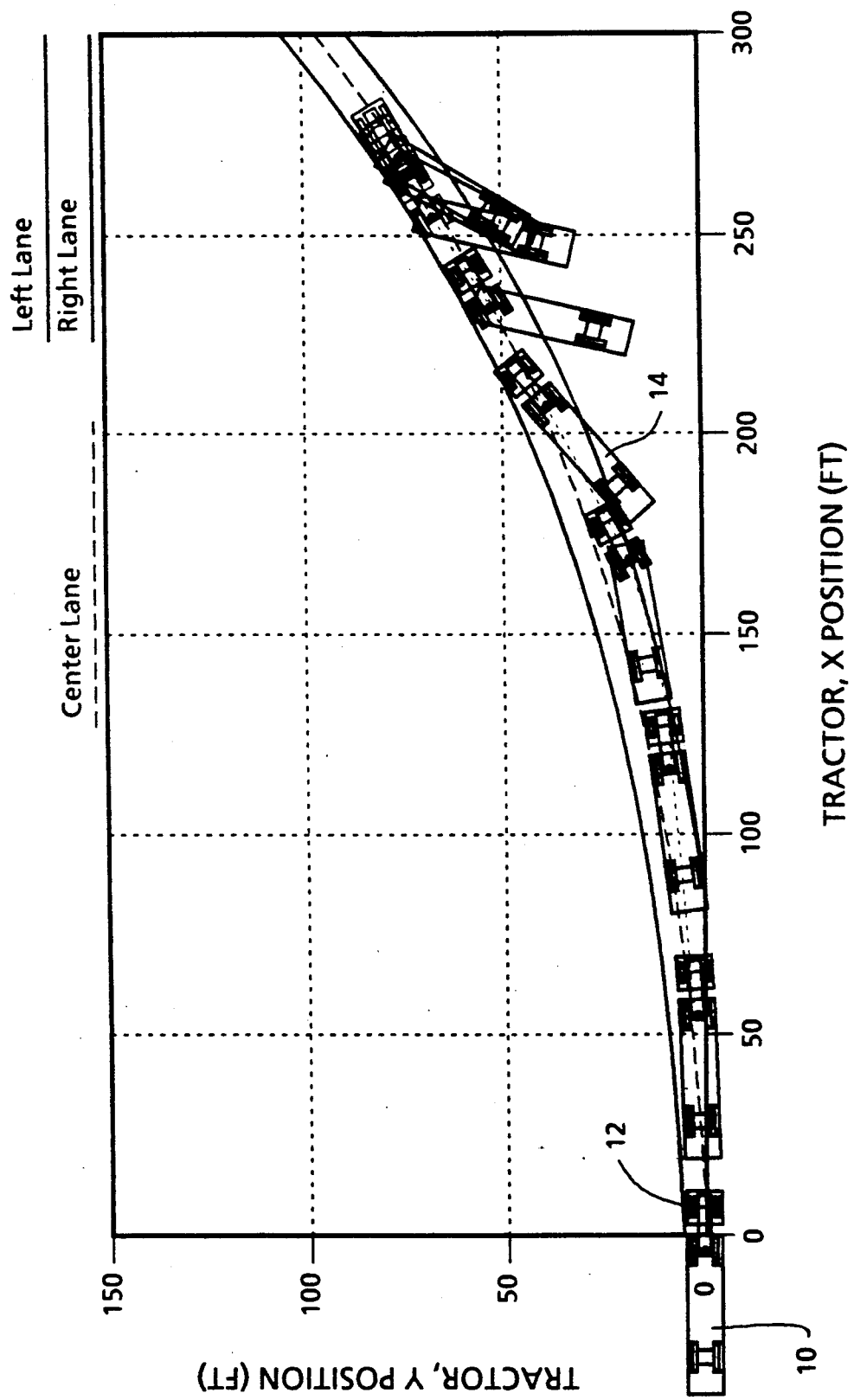
FIG. 6 is a schematic illustration of the occurrence of an uncontrolled trailer swing event.

The loss of transverse stability of the trailer wheels sufficient to result in a trailer swing event as illustrated in FIG. 6, is typically associated with an application of the trailer brakes as the vehicle 10 is maneuvered in a curve resulting in wheel slip exceeding a desirable value and/or total wheel lock. To prevent the occurrence of a trailer brake induced trailer swing event, or to arrest and minimize the extent thereof and to allow quick recovery therefrom, it is desirable that conditions indicative of incipient or actual onset of trailer swing be quickly sensed and that the vehicle brake system react thereto by releasing the trailer brakes allowing the trailer wheels to roll back up towards vehicle speed to minimize the slip and increase the transverse coefficient of friction, and thus increase the centripetal force of the trailer wheels.

The trailer anti-swing control method and system of the present invention is operable to sense conditions indicative of incipient, or the onset of, a trailer brake induced trailer swing event by the sensing and/or calculating if the vehicle brakes are applied therefor at least one or more of the articulated vehicles' articulation angle, and a time derivative of articulation angle, such as the first derivative of articulation angle with respect to time, and to compare these values with the range of expected values at current vehicle steer angle/dynamic turning radius of curvature conditions.

It is important to sense trailer swing at the initiation or onset, i.e. prior to the trailer swinging towards an almost zero articulation angle position, to have sufficient time to arrest and/or minimize the condition. It is also important to distinguish trailer swing from jackknife as different corrective responses are required.

Upon sensing conditions indicative of the onset of a trailer swing event, the control logic of the present invention will declare the existence of conditions indicative of an incipient trailer swing event and will release the trailer brakes for a given period of time (T) selected to allow the trailer wheels to roll back up towards vehicle speed to increase the transverse stability thereof and preferably minimize or eliminate the trailer swing and allow the trailer wheels to again track on the curve. After the predetermined period of time, trailer brakes will be reapplied at a rate (R) which may be fixed or may vary with measured system variables to a reapplication pressure (P) which is preferably a function of the value of the first and/or second derivative of articulation angle with respect to time at the onset of the trailer swing event. The brakes will be maintained at this pressure peak until such time as the braking event is terminated, i.e., the operator removes his foot from the brake pedal, at which point trailer brakes will again be controlled by the treadle valve until such time as incipient trailer swing is again sensed. The application of pressure to the trailer brakes is controlled by trailer anti-swing control valve 174, an ABS type valve, which varies the pressure applied to the pilot portion 202 of the trailer relay valve 198. A graphic illustration of the pressure applied to the trailer brakes to minimize and recover from a sensed incipient trailer swing event may be seen by reference to FIG. 5.

Figure 5:
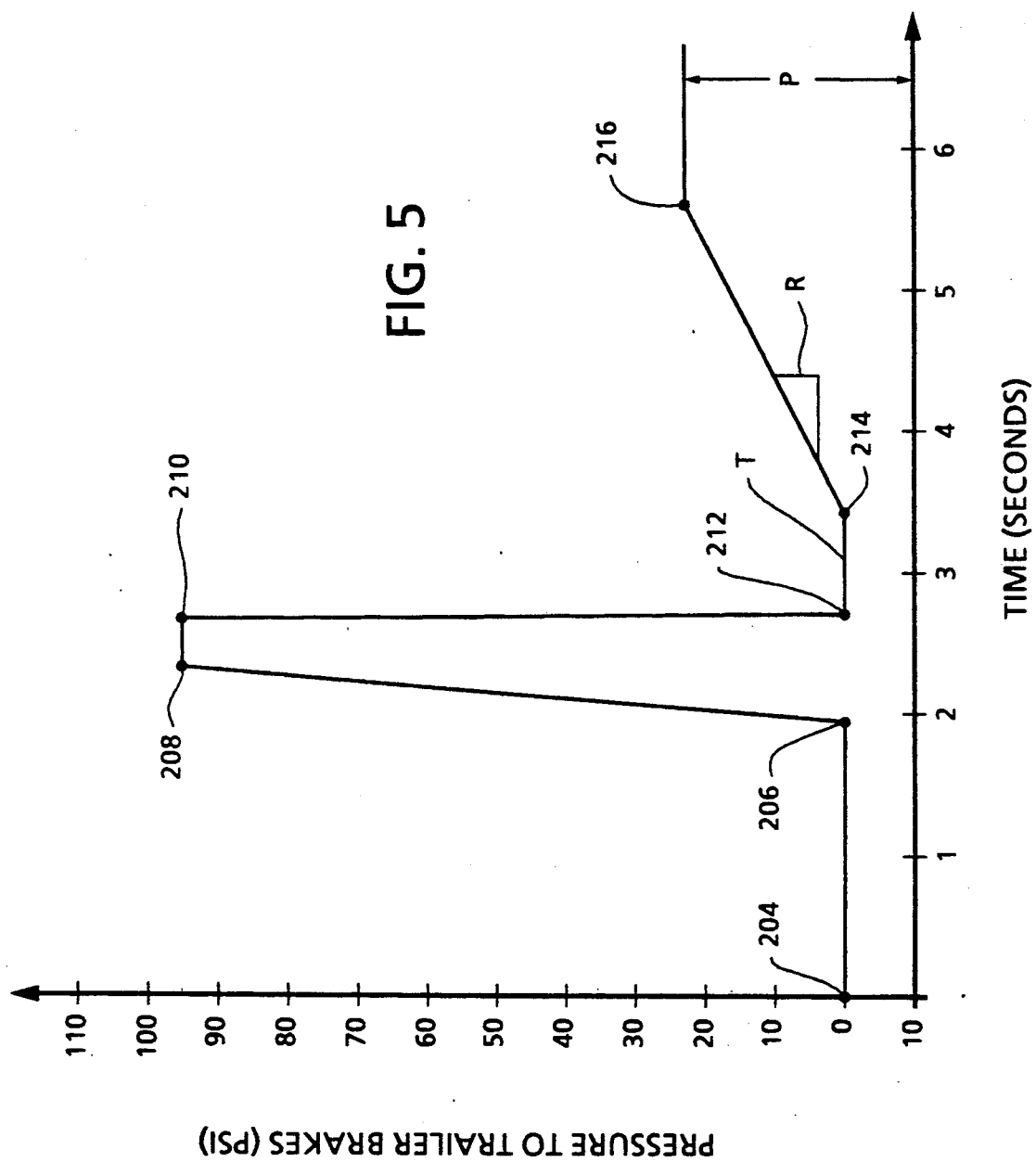
FIG. 5 is a graph illustrating the trailer brake applied pressure versus time curve(s) for the trailer anti-swing control system/method of the present invention.

Referring to FIG. 5, at point 204 to point 206 the vehicle brakes are not applied. At point 206, the vehicle operator has fully depressed the treadle valve or brake pedal 78 causing the relay valve 198 in the trailer, under the control of trailer brake control valve 174, to apply the trailer brakes with a high pressure as seen in point 208. If the operator continues to request a relatively high braking effort, trailer brakes will remain applied at a relatively high level from point 208 to point 210. For purposes of this example, at point 210 it will be assumed that the input signals processed by the CPU controller 70 indicate the existence of an incipient trailer swing event. The CPU 70 will then issue command output signals to the trailer brake control valve 174 causing the trailer brakes to be released as may be seen at point 212. The trailer brakes will be maintained in the released position for a period of time T which is selected as a time sufficient to allow the trailer wheels to roll back up to near vehicle speed. Time T may be predetermined or may vary with the value of sensed inputs to the CPU.

Typically, as the trailer wheels are not provided with speed sensors, this is an empirically predetermined value. Applicant has discovered that a period of time from 0.25 to 1.25, preferably from 0.50 to 0.75, seconds is sufficient to allow the trailer wheels to roll back up to approximately vehicle speed and allow the trailer brakes to be reapplied to minimize the stopping distance of the total vehicle 10.

Accordingly, at the end of the predetermined period of time T, i.e., at point 214, the trailer brakes are reapplied at a rate R until a pressure P is achieved at point 216, which pressure P is preferably a function of the sensed or calculated first and/or second derivative of the articulation angle at the onset of the trailer swing event. Vehicle brakes will then be maintained at pressure P until termination of the braking event. Applicants have discovered that a rate of reapply R equal to about 10 PSI per second is an effective rate to achieve the pressure P as rapidly as possible without resulting in a repeat trailer wheel transverse loss of stability.

To sense an incipient or occurring trailer swing event, the CPU 70 will determine a current value of articulation angle (AA) and preferably of a time derivative thereof (dAA/dt) based upon signals from the articulation angle sensors 170 and 172.

The CPU 70 will also determine an articulation angle reference value (REF$_1$) and preferably an articulation angle time derivative reference value (REF$_2$) as functions of sensed and/or calculated current dynamic turning radius of curvature (DTRC) or steer angle (SA), and a time derivative thereof, respectively. The references REF$_1$ and REF$_2$ may be single values or ranges of values and may be determined from a look up table provided in CPU memory.

If the vehicle is not equipped with a steer angle sensor 101, the related values of vehicle dynamic turning radius of curvature (DTRC) and of time derivatives thereof (dDTRC/dt) may be calculated from the wheel speed sensors, preferably at least the steer axle wheel speed sensors, 102 and 104, on opposite sides of the vehicles. The reference values, REF$_1$ and REF$_2$ may be determined as functions of dynamic turning radius of curvature and time derivatives thereof, respectively.

Figure 10:
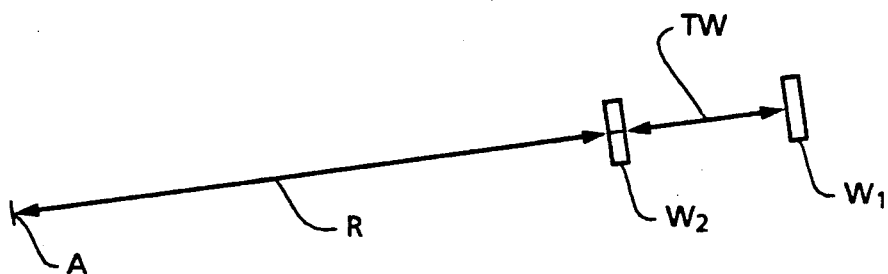
FIG. 10 is a schematic illustrating the calculation of an equilibrium turning radius of curvature.

Referring to FIG. 10, the equilibrium turning radius of (TRC$_E$) for a single axle vehicle in circular motion is $$TRC_E = \frac{1}{R} = \frac{1}{TW}\left(\frac{W_1}{W_2} - 1\right)$$

where:
A = center of circle,
R = turn radius,
W$_1$ = speed of the outside wheel,
W$_2$ = speed of the inside wheel, and
TW = track width = center to center spacing of the two wheels.

The above equation can be approximated as a dynamic equation by means of a series expansion:

$$DTRC = TRC_E + \Delta t\left(\frac{dTRC}{dW_1}\frac{dW_1}{dt} + \frac{dTRC}{dW_2}\frac{dW_2}{dt}\right) + \text{Higher Order Terms}$$

$$= \frac{1}{TW}\left[\left(\frac{W_1}{W_2} - 1\right) + \Delta t\left(\frac{1}{W_2}\dot{W}_1 - \frac{W_1}{W_2^2}\dot{W}_2\right)\right] + \text{Higher Order Terms}$$

where:
t = time
$\dot{W}_1$ = first time derivative of W$_1$, and
$\dot{W}_2$ = first time derivative of W$_2$ The higher order terms may be dropped as being less significant to the approximation of the dynamic value. Assuming the vehicle is in motion, the dynamic turning radius of curvature of the steer axle of a vehicle may be approximated as of function of the expression:

$$K\left(\frac{W_1}{W_2} - 1 + \Delta t\left(\frac{\dot{W}_1}{W_2} - \frac{W_1\dot{W}_2}{(W_2)^2}\right)\right)$$

K = a constant depending upon vehicle geometry;
W$_1$ = speed of the outside wheel;
W$_2$ = speed of the inside wheel;
$\dot{W}_1$ = first time derivative of W$_1$;
$\dot{W}_2$ = first time derivative of W$_2$; and
$\Delta t$ = change in time.

Figure 9:
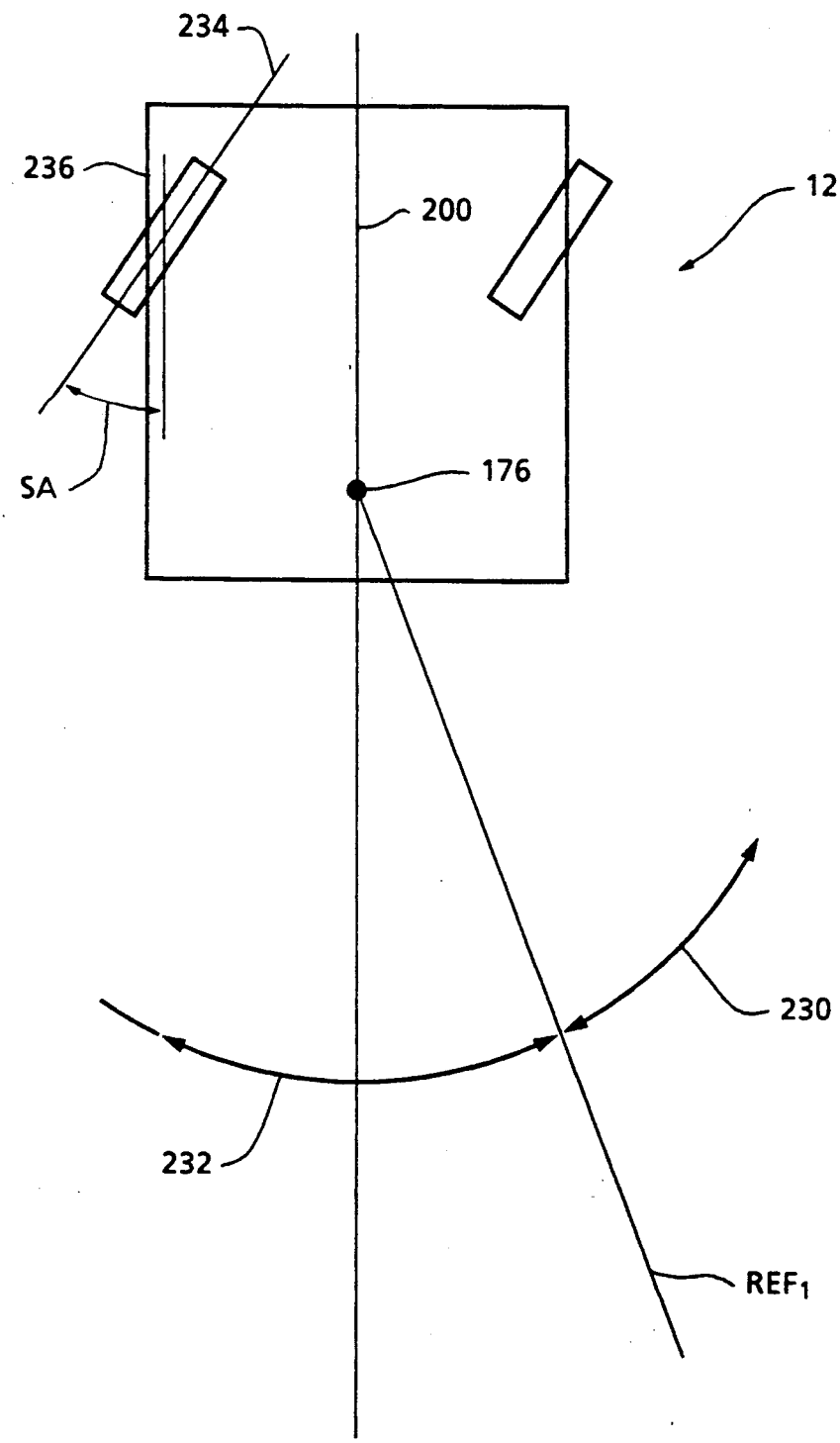
FIG. 9 is a schematic illustrating the control method of the present invention.

Referring to FIG. 9, based upon a sensed or calculated current steer angle SA (or sensed or calculated dynamic turning radius of curvature) for tractor 12, an expected reference articulation angle (REF$_1$) may be determined. Assuming REF$_1$ equals the minimum expected articulation angle at current dynamic turning radius of curvature or current steer angle, then a current sensed articulation angle in the area represented by arrow 230 represents a non-trailer swing event (but possibly a jackknife event) while current articulation angle in the area represented by arrow 232 represents an incipient or occurring trailer swing event.

Accordingly, unless the sensed articulation angle (AA) is in the same direction of rotation (of the same sign) as the first reference (REF$_1$) and the absolute value of the sensed articulation angle is equal to or greater than the absolute value of the first reference, a trailer swing event (i.e. trailer wheels transverse stability unable to overcome centrifugal forces on trailer) is incipient and/or occurring and the trailer brakes should be released to allow the trailer wheels to roll up to or towards vehicle speed thereby increasing the transverse stability thereof.

Similarly, for a sensed/calculated rate of change of dynamic turning radius of curvature (dDTRC/dt) or steer angle (dSA/dt), an expected rate of change of articulation angle (REF$_2$) may be determined. Referring to FIG. 9, if the steer angle increases over time, the absolute value of articulation angle should increase at a given rate while a decrease in absolute steer angle over time should result in the absolute value of articulation angle decreasing at a given rate. Therefore, a trailer swing event will be indicated in the following conditions:

(i) if the expected rate of change of articulation angle (REF$_2$) is in the same direction as REF$_1$ (i.e. a sharper cornering maneuver), if sensed rate of articulation angle (dAA/dt) is not in same direction of rotation as REF$_2$ or if the absolute value of dAA/dt does not equal or exceed the absolute value of REF$_2$;

(ii) if the expected rate of change of articulation angle (REF$_2$) is in the opposite direction as REF$_1$ (i.e. a straightening out maneuver), if dAA/dt is in the same direction as REF$_2$ and the absolute value of dAA/dt is greater than the absolute value of REF$_2$; or (iii) if the absolute value of REF$_2$ equals about zero (i.e. a steady turn) and the absolute value of sensed dAA/dt exceeds the absolute value of REF$_2$.

Of critical importance in the trailer brake control system is the accurate determination of the dynamic turning radius of the vehicle axles. This determination is exacerbated when the brakes are activated and the driver is maneuvering the vehicle, exactly the conditions under which the trailer brake control system would be most helpful. The following signal processing algorithm is included as applicants method of accurately determining the dynamic turning radius of vehicle axles in a vehicle that is not equipped with a steer angle sensor.

Typically, all of the wheels of the tractor are equipped with wheel speed sensors (98, 100, 102, 104, 160b and 162). The variances of the three left (VAR-L) wheel speeds (150, 146, and 142) and that of the three right (VAR-R) wheel speeds (148, 144 and 140) are computed. The variance values are used to determine the gains in three adaptive low-pass digital filters which ultimately calculate the dynamic turning radius of curvature of each tractor axle and a value indicative of relative degree of confidence as to the accuracy as their output.

Figure 11:
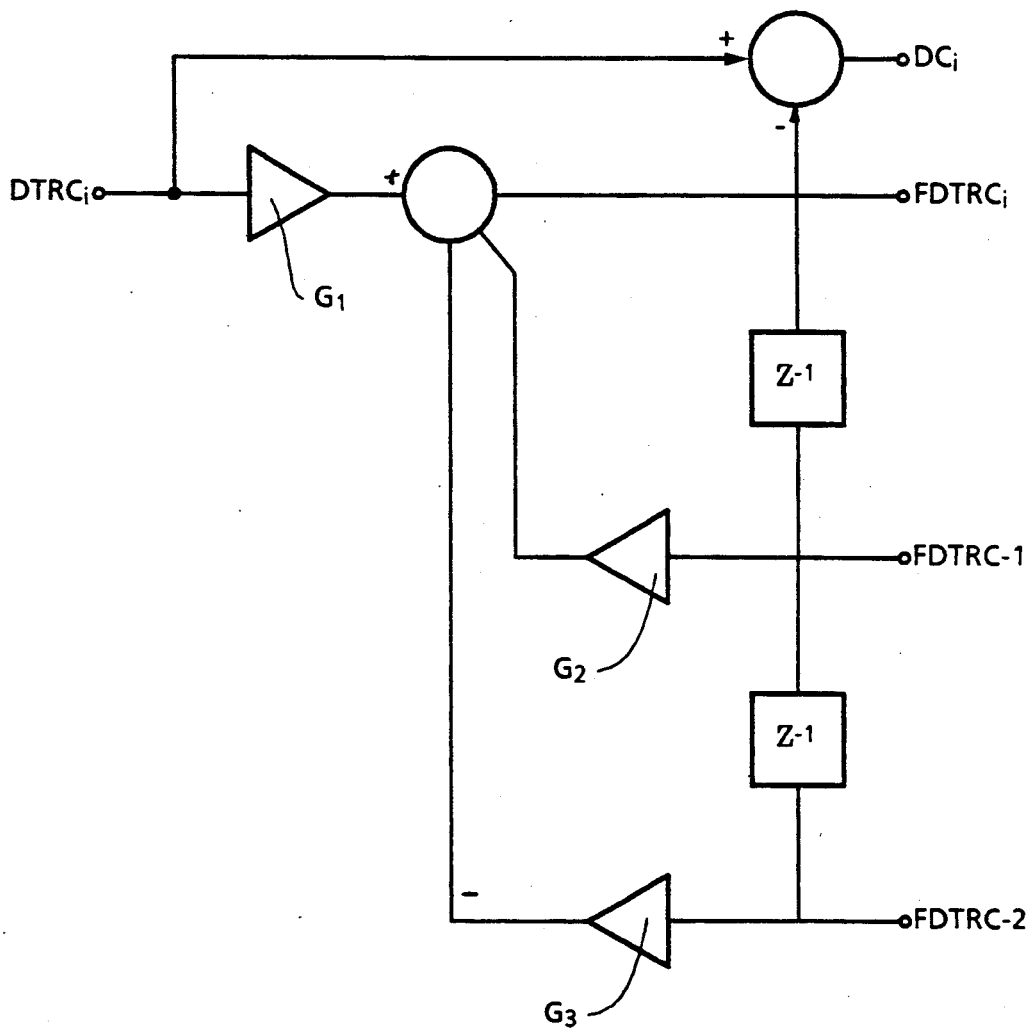
FIG. 11 is a schematic illustrating a filter for determining a filtered value of an axle dynamic turning radius of curvature.

Referring to FIG. 11, dynamic turning radius of curvature (DTRC$_i$) is computed for each axle of the tractor by the previously described equation. These values of DTRC are then used as input to second order low-pass adaptive filters the gains G1, G2 and G3 of which are adjusted as a function of the sum of the left and right wheel speed variances. The second order adaptive filter shown in FIG. 11 is generally described by the following equation:

$$FDTRC = G2*FDTRC-1 - G3*FDTRC-2 + G1*DTRC$$

Where
  $Gi = fi(VAR\text{-}L + VAR\text{-}R)$ i = 1, 2, 3 ... K
  K = member of the tractor axles equipped with wheel speed sensors.

The filtered outputs FDTRC are then used as parameters to determine REF$_1$ by means of a look-up table. A similar set of adaptive filters are used to determine REF$_2$ except that in this case the set of dDTRC/dt's are used as filter inputs and a different look-up table is employed.

The degree of confidence (DC) is determined by subtracting the filter inputs (DTRC) from the filter outputs (FDTRC). If the results are near zero, the confidence is said to be high: If the results are near zero, the confidence is said to be high: If the results are far from zero, the confidence is said to be low.

$$DC = DTRC - FDTRC$$

Obviously, as the vehicle is heavily braked, the degree of confidence in the ability to estimate its DTRC will be go from high to low. However, the typical sequence of events will allow activation of the trailer stability system TSS, should activation be warranted, while the degree of confidence remains relatively high. One of the main reasons for the above statement to be true is the fact that the steering ratio (angular change in steering wheel divided by the angular change in steer angle of the front wheels) is typically about 30:1, thus, the driver physically cannot change the turning radius of the vehicle very fast when compared to the dynamics of jackknife, trailer swing and wheels decelerating under heavy braking.

Thus, a further constraint is placed on the activation of the trailer stability system; that being the requirement that the degree of confidence (as defined above) be relatively high for the value indicative of dynamic radius of curvature for at least one of the axles of the vehicle, i.e. sufficiently close to zero.

Although not directly related to this particular trailer brake control system/method, the above method of computing the dynamic turning radius of curvature of a vehicle and a measure of its accuracy (confidence) has a broad range of applicability that the applicant has not failed to recognize. The method could also be used to determine if a vehicle is approaching jackknife conditions and trigger corrective action as well as to adapt full vehicle ABS system parameters to the braking-/maneuvering conditions presently being experienced by a vehicle.

The fact that a second order adaptive filter was selected for this particular disclosure is not to say that other order filters are not possible—they are merely variations on the theme.

The gains Gi (i = 1,2, ... n where n = 1 + filter order) are chosen such that the filter is a unity gain filter. Aplicants method of determining gains is to make G2 and G3 inversely proportional to the sum of the left and right wheel speed variances and to choose G1 so as to meet the unity gain filter requirement. Other methods are certainly possible but the key concept is to make gain inversely proportional to the sum of the left and right wheel speed variances (VAR-L and VAR-R).

To assure that such action will correct and not exacerbate an existing situation, the level of confidence in the calculated/approximated value of DTRC is determined and corrective action is not undertaken until the level of confidence exceeds a predetermined value.

Figure 8:
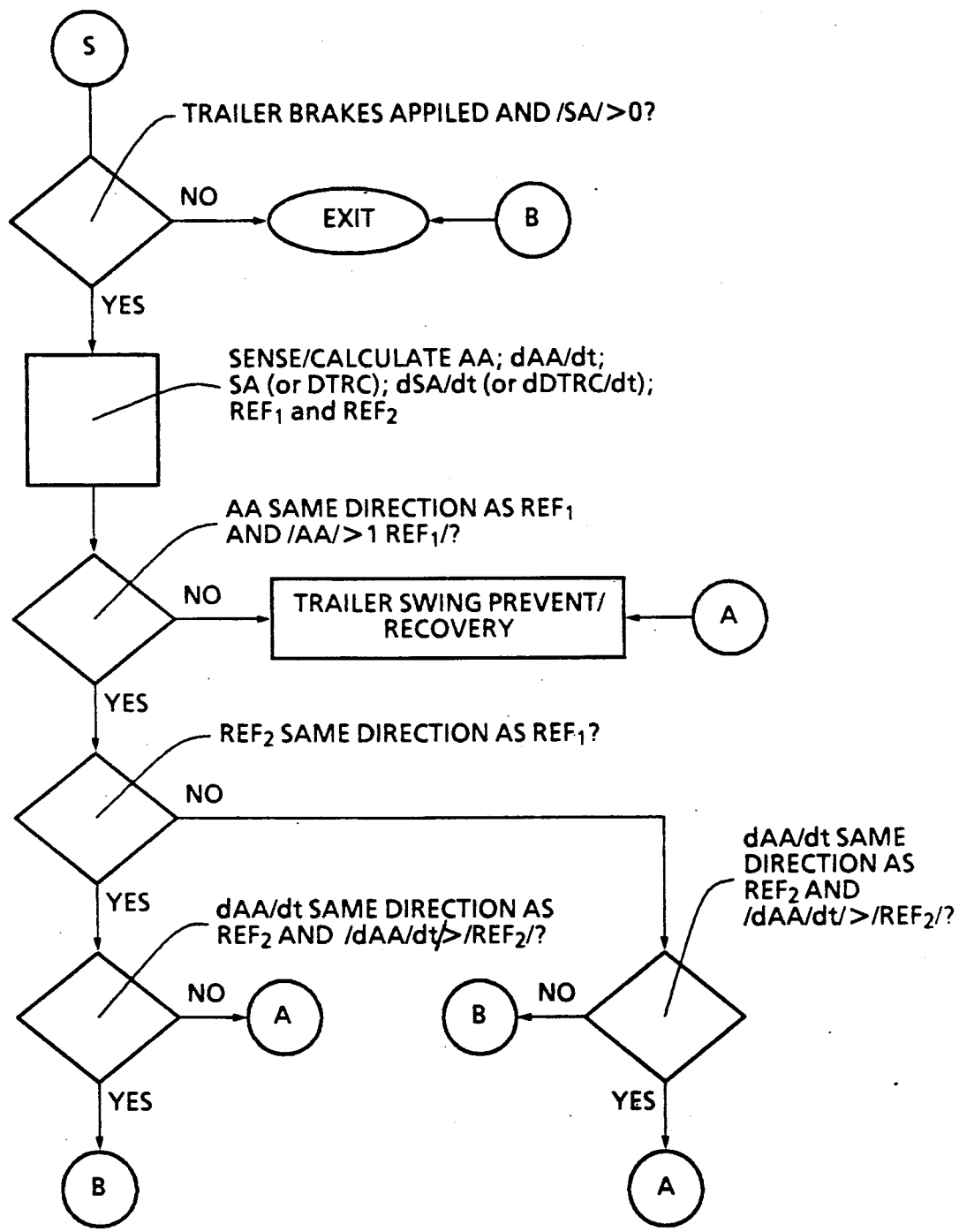
FIG. 8 is a schematic illustration, in the form of a flow chart, of the trailer anti-swing control system/method of the present invention.

The control system/method of the present invention is schematically illustrated, in flow chart format, in FIG. 8.

As is known, the use of higher order time derivatives of sensed steer angle or dynamic turning radius of curvature and articulation angle will provide the possibility of earlier sensing of an incipient trailer swing condition, especially for more lightly loaded trailers and/or lower coefficient of friction road surfaces, while the use of lower order time derivatives responds somewhat later in time but will allow a less sensitive, somewhat more reliable, determination of incipient trailer swing especially for more heavily loaded trailers and/or higher coefficient of friction road surfaces. Accordingly, the various logical methods described herein for testing for trailer swing conditions are not considered to be mutually exclusive but may be used in combination with one another.

Various sensing devices for sensing the articulated vehicle articulation angle, first derivative of articulation angle with respect to time, and/or higher derivatives of articulation angle with respect to time may be utilized.

Figure 7:
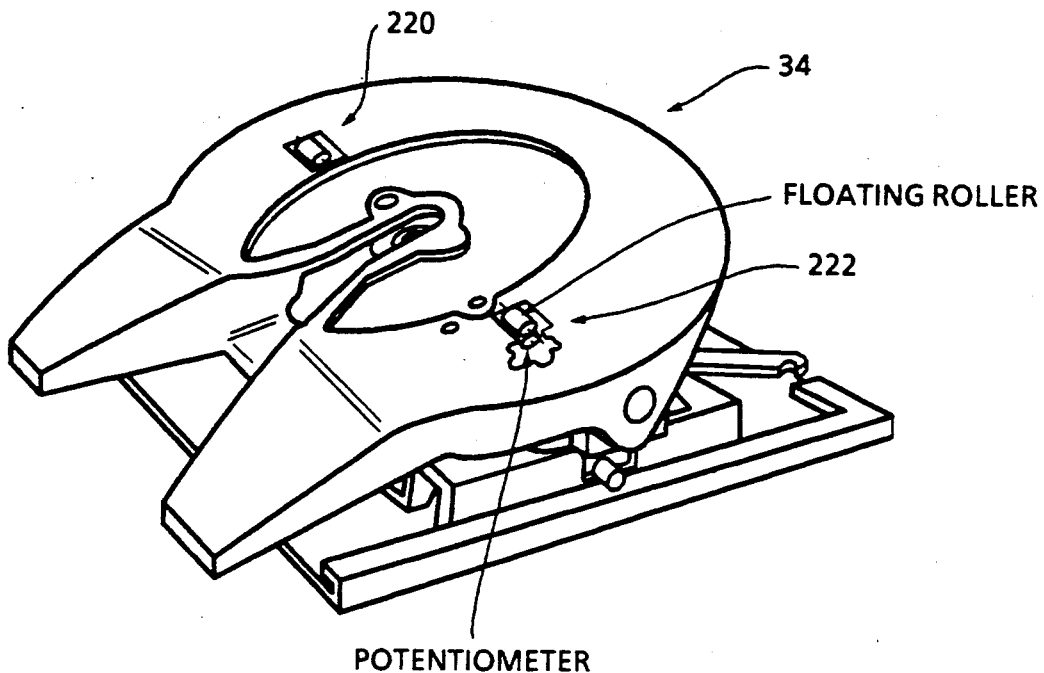
FIG. 7 is an illustration of a floating rotor potentiometer type of articulation angle sensor for the control system/method of the present invention.

By way of an example, referring to FIG. 7, a fifth wheel assembly 34 is modified by the provision of two rollers, preferably spring loaded floating rollers 220 and 222 which are associated with potentiometers or the like and which will be caused to rotate by pivotal movement of the tractor relative to the trailer to provide input signals indicative of articulation angle and/or the first or second derivatives thereof with respect to time.

As may be seen, applicant has provided an improved method for calculating a value (FDTRC) indicative of vehicle dynamic turning radius of curvature (DTRC), for calculating the degree of confidence in such value, and a trailer brake control system/method for controlling the trailer brake application forces to prevent, arrest or minimize and provide rapid recovery from trailer swing events.

While the present invention has been described with a certain degree of particularity, it is understood that the detailed description of the preferred embodiments is by way of example only and that numerous modifications and rearrangements of the components/steps thereof is possible without departing from the spirit and the scope of the present invention as hereinafter claimed.

I claim:

1. A control method for vehicles (10) of the type comprising a pair of steerable wheels (148, 150) associated with a front-steer axle (40) and at least one rear axle (36, 38) having wheels associated therewith, wheel speed sensors (98, 100, 160, 162, 102, 104) associated with the wheels on at least two of said axles for providing input signals indicative of the rotational speed of said wheels and a control unit (70) for receiving said input signals and processing same in accordance with predetermined logic rules and issuing command output signals, said control method characterized by:

determining as a function of said wheel speeds a value (DTRC) indicative of at least one of the dynamic turning radius of curvature and a time derivative of the dynamic turning radius of curvature for at least one of said axles;

comparing the monitored wheel speeds on each side of the vehicle to determine a speed variance value (VAR-L, VAR-R) for each side of the vehicle;

using the speed variance values (VAR-L, VAR-R) to filter the values (DTRC) indicative of at least one of dynamic turning radius of curvature and a time derivative of the dynamic turning radius of curvature to calculate a filtered value (FDTRC) for said at least one of said axles; and comparing the value indicative of at least one of the dynamic turning radius of curvature and a time derivative of the dynamic turning radius of curvature to the filtered value for said at least one of said axles to calculate a degree of confidence (DC) for at least one of the value and the filtered value for said at least one of said axles.

2. The control method of claim 1 further comprising, only if the degree of confidence (DC) for at least one of the value indicative of at least one of the dynamic turning radius of curvature and a time derivative of the dynamic turning radius of curvature and the filtered value for at least one axle exceeds a reference, utilizing said at least one of the value indicative of at least one of the dynamic turning radius of curvature and a time derivative of the dynamic turning radius of curvature and the filtered value to control said vehicle.

3. A trailer brake control method for articulated vehicles (10) of the type comprising a tractor (12) and a trailer (14) connected to said tractor at an articulating connection (34/176) defining a pivot axis (176) about which the trailer is pivotable relative to the tractor, an articulation angle (AA) of said vehicle defined by the included angle defined by a longitudinally extending axis of the trailer (202) passing through said pivot axis relative to a longitudinally extending axis of the tractor (200) passing through said pivot axis, said tractor (12) including a pair of steerable wheels (148, 150) associated with a front-steer axle (40) and at least one rear-drive axle (36, 38) having wheels associated therewith, a tractor brake system, a trailer brake system, a driver operated brake effort demand device (76/78) for providing a demand input signal indicative of the magnitude of operators demand for vehicle braking, trailer brake control means (174) responsive in at least one operating mode for causing the trailer brake system to be applied with an operating force generally proportional to the magnitude of said demand input signal and in a second operating mode for causing the trailer brakes to be applied in a predetermined manner selected to increase the stability of the tractor-trailer vehicle, wheel speed sensors (98, 100, 160, 162, 102, 104) associated with the wheels of said front-steer and rear-drive axles for providing input signals indicative of the rotational speed of said wheels and a control unit (70) for receiving said input signals and processing same in accordance with predetermined logic rules and issuing command output signals, said control method characterized by:

determining (170/172) a value indicative of at least one of the articulation angle (AA) and a time derivative of the articulation angle (dAA/dt) and providing at least one articulation input signal indicative thereof;

determining as a function of said wheel speeds a value (DTRC) indicative of at least one of the dynamic turning radius of curvature and a time derivative of the dynamic turning radius of curvature for each of at least two of said axles;

comparing the monitored wheel speeds on each side of the vehicle to determine a speed variance value (VAR-L, VAR-R) for each side of the vehicle;

using the speed variance values (VAR-L, VAR-R) to filter the values (DTRC) indicative of at least one of dynamic turning radius of curvature and a time derivative of the dynamic turning radius of curvature to calculate a filtered value (FDTRC) for each of said at least two of said axles, comparing the values indicative of at least one of the dynamic turning radius of curvature and a time derivative of the dynamic turning radius of curvature to the filtered values for each axle to calculate a degree of confidence (DC) for at least one of said values indicative of at least one of the dynamic turning radius of curvature and a time derivative of the dynamic turning radius of curvature and filtered value; and only if at least the degree of confidence (DC) for the at least one of said values indicative of at least one of the dynamic turning radius of curvature and a time derivative of the dynamic turning radius of curvature and filtered value for at least one axle exceeds a reference, allowing said control unit to issue command outputs causing said trailer brakes to be operated in said second operating mode.

4. The control method of claim 3 wherein said filtered values (FDTRC) are calculated as a function of $$(G2*FDTRC-1)+(G3*FDTRC-2)+(G1*DTRC)$$

where:
FDTRC is the filtered value, and
Gi is a gain which is a function of (VAR-L, VAR-R); i=1,2,3.

5. A control method for vehicles (10) of the type comprising a pair of steerable wheel (148, 150) associated with a front-steer axle (40) and at least one rear axle (36, 38) having wheels associated therewith, wheel speed sensors (98, 100, 160, 162, 102, 104) associated with the wheels on said front steer and rear axles for providing input signals and a control unit (70) for receiving said input signals and processing same in accordance with predetermined logic rules and issuing command output signals indicative of the rotational speeds of said wheels, said control method characterized by:

determining as a function of said wheel speeds a value (DTRC) indicative of at least one of the dynamic turning radius of curvature and a time derivative of the dynamic turning radius of curvature for at least two of said axles;

comparing the monitored wheel speeds on each side of the vehicle to determine a speed variance value (VAR-L, VAR-R) for each side of the vehicle;

using the speed variance values ((VAR-L, VAR-R) to filter the values (DTRC) indicative of at least one of dynamic turning radius of curvature and a time derivative of the dynamic turning radius of curvature to calculate a filtered value (FDTRC) for each of said at least two of said axles, comparing the values indicative of at least one of the dynamic turning radius of curvature and a time derivative of the dynamic turning radius of curvature to the filtered values for each of said at least two of said axles to calculate a degree of confidence (DC) for at least one of said values indicative of at least one of the dynamic turning radius of curvature and a time derivative of the dynamic turning radius of curvature and filtered value for each of said at least two of said axles.

6. A trailer brake control method for articulated vehicles (10) of the type comprising a tractor (12) and a trailer (14) connected to said tractor at an articulating connection (34/176) defining a pivot axis (176) about which the trailer is pivotable relative to the tractor, said trailer having trailer brakes and a trailer brake control system associated therewith, an articulation angle (AA) of said vehicle defined by the included angle defined by a longitudinally extending axis of the trailer (202) passing through said pivot avis relative to a longitudinally extending axis of the tractor (200) passing through said pivot axis (200), said tractor (12) including a pair of steerable wheels (148, 150) associated with a front-steer axle (40) and at least one rear-drive axle (36, 38) having wheels associated therewith, a tractor brake system, a trailer brake system, a driver operated brake effort demand device (76/78) for providing a demand input signal indicative of the magnitude of operators demand for vehicle braking, trailer brake control means (174) responsive in at least one operating mode for causing the trailer brake system to be applied with an operating force generally proportional to the magnitude of said demand input signal and in a second operating mode for causing the trailer brakes to be applied in a predetermined manner selected to increase the stability of the tractor-trailer vehicle, wheel speed sensors (98, 100, 160, 102, 104) associated with the wheels in said front-steer and rear-drive axles for providing input signals indicative of the rotational speed of said wheels and a control unit (70) for receiving said input signals and processing same in accordance with predetermined logic rules and issuing command output signals, said control method characterized by:

determining as a function of said wheel speeds a value (DTRC) indicative of at lest one of the dynamic turning radius of curvature and a time derivative of the dynamic turning radius of curvature for at least two of said axles;

comparing the monitored wheel speeds on each side of the vehicle to determine a speed variance value (VAR-L, VAR-R) for each side of the vehicle;

using the speed variance values (VAR-L, VAR-R) to filter the values (DTRC) indicative of at least one of dynamic turning radius of curvature and a time derivative of the dynamic turning radius of curvature to calculate a filtered value (FDTRC) for each of said at least two of said axles, comparing the values indicative of at least one of the dynamic turning radius of curvature and a time derivative of the dynamic turning radius of curvature to the filtered values for each axle to calculate a degree of confidence (DC) for at least one of said values indicative of at least one of the dynamic turning radius of curvature and a time derivative of the dynamic turning radius of curvature and filtered value; and only if at least the degree of confidence (DC) for the at least one of said values indicative of at least one of the dynamic turning radius of curvature and a time derivative of the dynamic turning radius of curvature and filtered value for at least one axle exceeds a reference, allowing said control unit to issue command outputs causing said trailer brakes to be operated in said second operating mode.

7. A control system for vehicles (10) of the type comprising a pair of steerable wheels (148, 150) associated with a front-steer axle (40) and at least one rear axle (36, 38) having wheels associated therewith, wheel speed sensors (98, 100, 160, 162, 102, 104) associated with the wheels on at least two of said axles for providing input signals indicative of the rotational speed of said wheels and a control unit (70) for receiving said input signals and processing same in accordance with predetermined logic rules and issuing command output signals, said control system characterized by:

means for determining as a function of said wheel speeds a value (DTRC) indicative of at least one of the dynamic turning radius of curvature and a time derivative of the dynamic turning radius of curvature for at lest one of said axles;

means for comparing the monitored wheel speeds on each side of the vehicle to determine a speed variance value ((VAR-L, VAR-R) for each side of the vehicle;

means for using the speed variance values (VAR-L, VAR-R) to filter the values (DTRC) indicative of at least one of dynamic turning radius of curvature and a time derivative of the dynamic turning radius of curvature to calculate a filtered value (FDTRC) for said at least one of said axles, and means for comparing the value indicative of at least one of the dynamic turning radius of curvature and a time derivative of the dynamic turning radius of curvature to the filtered value for said at least one of said axles to calculate a degree of confidence (DC) for at least one of the values indicative of at least one of the dynamic turning radius of curvature and a time derivative of the dynamic turning radius of curvature and the filtered value for said at least one of said axles.

8. The control system of claim 7 further comprising means, effective only if the degree of confidence (DC) for at least one of the value indicative of at least one of the dynamic turning radius of curvature and a time derivative of the dynamic turning radius of curvature and the filtered value for at least one axle exceeds a reference, for utilizing said at least one of the value indicative of at least one of the dynamic turning radius of curvature and a time derivative of the dynamic turning radius of curvature and the filtered value to control said vehicle.

9. A trailer brake control system for articulated vehicles (10) of the type comprising a tractor (12) and a trailer (14) provided with trailer brakes and connected to said tractor at an articulating connection (34/176) defining a pivot axis (176) about which the trailer is pivotable relative to the tractor, an articulation angle (AA) of said vehicle defined by the included angle defined by a longitudinally extending axis of the trailer (202) passing through said pivot axis relative to a longitudinally extending axis of the tractor (200) passing through said pivot axis, said tractor (12) including a pair of steerable wheels (148, 150) associated with a front-steer axle (40) and at least one rear-drive axle (36, 38) having wheels associated therewith, a tractor brake system, a trailer brake system, a driver operated brake effort demand device (76/78) for providing a demand input signal indicative of the magnitude of operators demand for vehicle braking, trailer brake control means (174) responsive in at least one operating mode for causing the trailer brake system to be applied with an operating force generally proportional to the magnitude of said demand input signal and in a second operating mode for causing the trailer brakes to be applied in a predetermined manner selected to increase the stability of the tractor-trailer vehicle, wheel speed sensors (98, 100, 160, 162, 102, 104) associated with the wheels in said front-steer and rear-drive axles for providing input signals indicative of the rotational speed of said wheels and a control unit (70) for receiving said input signals and processing same in accordance with predetermined logic rules and issuing command output signals, said control system characterized by:

means for determining as a function of said wheel speeds a value (DTRC) indicative of at least one of the dynamic turning radius of curvature and a time derivative of the dynamic turning radius of curvature for at least two of said axles;

means for comparing the monitored wheel speeds on each side of the vehicle to determine a speed variance value (VAR-L, VAR-R) for each side of the vehicle;

means for using the speed variance values (VAR-L, VAR-R) to filter the values (DTRC) indicative of at least one of dynamic turning radius of curvature and a time derivative of the dynamic turning radius of curvature to calculate a filtered value (FDTRC) for each of said at least two of said axles, means for comparing the values indicative of at least of the dynamic turning radius of curvature and a time derivative of the dynamic turning radius of curvature to the filtered values for each axle to calculate a degree of confidence (DC) for at least one of said values indicative of at least one of the dynamic turning radius of curvature and a time derivative of the dynamic turning radius of curvature and filtered value; and means effective only if at least the degree of confidence (DC) for the at least one of said values indicative of at least one of the dynamic turning radius of curvature and a time derivative of the dynamic turning radius of curvature and filtered value for at least one axle exceeds a reference, for allowing said control unit to issue command outputs causing said trailer brakes to be operated in said second operating mode.

10. A control method for vehicles (10) of the type comprising a pair of steerable wheels (148, 150) associated with a front-steer axle (40) and at least one rear axle (36, 36) having wheels associated therewith, wheel speed sensors (98, 100, 160, 162, 102, 104) associated with the wheels on at least two of said axles for providing input signals indicative of the rotational speed of said wheels and a control unit (70) for receiving said input signals and processing same in accordance with predetermined logic rules and issuing command output signals, said control method characterized by:

determining as a function of said wheel speeds a value (DTRC) indicative of at least one of the dynamic turning radius of curvature and a time derivative of the dynamic turning radius of curvature for at least one of said axles;

comparing the monitored wheel speeds on each side of the vehicle to determine a speed variance value (VAR-L, VAR-R) for each side of the vehicle; and using the speed variance values (VAR-L, VAR-R) to calculate a degree of confidence (DC) for said value indicative of at least one of the dynamic turning radius of curvature and a time derivative of the dynamic turning radius of curvature for said at least one of said axles.

11. The control method of claim 10 further comprising, only if the degree of confidence (DC) for at least one of the value indicative of at least one of the dynamic turning radius of curvature and a time derivative of the dynamic turning radius of curvature and the filtered value for at least one axle exceeds a reference, utilizing said at least one of the value indicative of at least one of the dynamic turning radius of curvature and a time derivative of the dynamic turning radius of curvature and the filtered value to control said vehicle.

* * * * *